Aug. 21, 1962 J. P. RUNYON 3,050,586

RECIPROCAL TIMING OF TIME DIVISION SWITCHING CENTERS

Filed May 20, 1960 4 Sheets-Sheet 1

INVENTOR
J.P. RUNYON
BY Harry C. Hart
ATTORNEY

RECIPROCAL TIMING OF TIME DIVISION SWITCHING CENTERS

Filed May 20, 1960

INVENTOR
J.P. RUNYON
BY Harry C. Hart
ATTORNEY

Aug. 21, 1962 J. P. RUNYON 3,050,586
RECIPROCAL TIMING OF TIME DIVISION SWITCHING CENTERS
Filed May 20, 1960 4 Sheets-Sheet 3

INVENTOR
J. P. RUNYON
BY Harry C. Hart
ATTORNEY

Aug. 21, 1962 J. P. RUNYON 3,050,586

RECIPROCAL TIMING OF TIME DIVISION SWITCHING CENTERS

Filed May 20, 1960 4 Sheets-Sheet 4

INVENTOR
J. P. RUNYON
BY Harry C. Hart
ATTORNEY

United States Patent Office 3,050,586
Patented Aug. 21, 1962

3,050,586

RECIPROCAL TIMING OF TIME DIVISION SWITCHING CENTERS

John P. Runyon, Mendham, N.J., assignor to Bell Telephone Laboratories, Incorporated, New York, N.Y., a corporation of New York Filed May 20, 1960, Ser. No. 30,551
19 Claims. (Cl. 179—15)

This invention deals with time division multiplex communication. Its general object is to provide timing controls for the switching centers of a time division multiplex system of a sort that permits indefinite enlargement of the system and multiplication of its complexity. A more specific object is to render such a system insensitive to departures of its component elements from their intended behavior. A related object is to render the system as a whole invulnerable to the consequences of failure of one or more of its component parts.

The natural approach to the solution of the timing control problem in a multiplex communication system is to designate a specified center to serve as master and to enslave all the other centers to it, i.e., to constrain them to have the same timing frequency as that originating at the master center. For example, in the simplest case of a two-center system one of these, for example, an east center, can generate a timing wave which then travels, along with the information-bearing wave, to the west center. There, it controls all the necessary operations, both for accepting incoming time division multiplexed (hereinafter abbreviated TDM) information, and for delivering outgoing TDM information destined for the east center. In other words, the transmitter operations at the west center may be synchronized with its receiver operations, its local timing wave source being phase-locked with the incoming timing wave.

When distances are long, and frequencies are high, the single communication link extending from the east center to the west center may well embrace a number of wavelengths of the timing wave—a number that is not necessarily an integer, and one that may be large. For example, at a frequency of 1.5 megacycles per second, the free space wavelength is 200 meters, and the wavelength on a transmission line is somewhat less. Thus a link that is one mile in length embraces nearly ten full wavelengths. The same is true for the return link extending from west to east, so that the entire loop may embrace more than twenty wavelengths, in the example of one mile separation between centers. Evidently, the master timing wave, on its return to its point of origin at the east center, stands in a phase relation to its outgoing self that is a very complex one: it depends on the distance travelled and on the speed of propagation. This speed, in turn, depends on the characteristics of the transmission medium, and these may depend on the temperature. It may therefore be necessary to interpose a delay equalizer in the west-east path, at the east, whose purpose is to "mop up" phase discrepancies between outgoing and incoming waves and to provide, with a servo control system, for its continual readjustment so that it shall mop up variations in the phase discrepancies, as well as the discrepancies themselves. Apparatus of this kind is described in an application of D. B. James, J. D. Johannesen, M. Karnaugh and W. A. Malthaner, Serial No. 760,502, filed September 11, 1958, now matured into Patent 2,957,948, granted October 25, 1960.

The technique of controlled phase delay equalization can be extended to a situation in which a third switching center is added to the system. For example, the third center may be located at an intermediate point between the east center and the west center and must be prepared to engage in two-way communication with either of them.

In order that its operations may be performed systematically, and in a fashion that is fully compatible with the two-way east-west communication already in progress an additional controllable delay equalizer may be provided at the intermediate center to bring the phase of the west-east timing wave at the intermediate center into coincidence, or other specified relation, with the east-west timing wave at the same point. Apparatus of this character is described in a copending application of R. L. Carbrey, Serial No. 30,633, filed May 20, 1960.

It is inherent in the nature of a master-slave organization that operations at all the slave centers cease upon a failure of the master timing wave. Such a failure may be due to a casualty to the master timing wave source itself, or to casualties to the transmission systems that link it to its immediate neighbors. The seriousness of such a failure increases in proportion to the number of centers that make up the system and becomes prohibitive for a network that covers a continent. The difficulty can be overcome, in principle, by designation of an alternate master to take control in the event of a casualty to the original master. A system by which the necessary reorganization of the entire network is carried out is described in a copending application of G. C. Darwin and R. C. Prim, Serial No. 11,269, filed February 26, 1960, now matured into Patent 2,986,723 granted May 30, 1961. The apparatus and its operations are complicated; and after the reorganization is complete, the network is still one of the master-slave class, and hence similarly vulnerable to a casualty to the alternate master.

The present invention approaches the problem of timing control for a time division communication network of nationwide scope from a different avenue. It abandons, entirely, the master-slave, or autocracy, principle by which all centers are directed by a single autonomous center and embodies, instead, a different principle which may be termed "reciprocal timing." According to this principle each switching center of the network, or in any event each of a subgroup including a substantial number of centers spread over the area to be covered, influences the timing operations of the entire network as much as does any of the others, but no more: it has but a signle "vote" as to what the controlling timing wave shall be, that is to say, the frequency of the timing wave originating with it has a like inflence with the frequencies of timing waves originating at other centers in determining the ultimate frequency of the timing wave that synchronizes the entire network. Hence a reciprocal timing system can be said to be "democratic" in the Greek sense in that the centers with timing sources, i.e., citizen voters, make equal contributions to the timing wave of the system, although the centers without timing sources, i.e., slave non-voters, make no contributions at all, and a failure of the timing wave originating at any one center leaves the control of the many-center network largely unaltered: only a single "vote" has been removed. Furthermore, because the center originating the timing wave that has failed receives influences from all the others, it can continue to function, operating now as a slave to many masters, i.e., to the centers that remain "citizens" and continue to "vote" by supplying timing waves, rather than being subject to the unique timing wave of a single autocratic master. Hence the failure of the timing wave originating at any one center, and even the simultaneous failures of several such timing waves, merely reduces the number of individual influences that contribute to the result—they reduce the complexity of the timing network—but they do not disable the communication network or any of the centers of which it is composed.

The invulnerability feature of the invention is secured by the provision of a timing wave source, e.g., a "local oscillator," in at least a large number of the switching centers of the network; i.e., in every center of the timing control subgroup of switching centers, and the reciprocal principle is embodied by arranging that the frequency of each such local oscillator shall follow the frequency average of the timing waves of the other timing wave sources. Once this average has been developed, at each center, for all incoming timing waves, and once the locally generated timing wave has been brought to isochronism with it, and hence, also, to a definite phase relation with it, it can serve as a local timing wave of reference frequency and reference phase. The phase of the information-bearing wave incoming on each channel is then individually compared with the reference phase of the local timing wave and, as a result of the comparison, a controlled amount of variable delay is introduced in tandem with the information-bearing wave of that channel; and as the phase of the incoming wave changes in its lag or lead, due to temperature changes on the communication link or otherwise, the compensating delay is altered to offset the phase shift, thus to preserve a desired preassigned phase relation between the incoming wave and the local reference wave.

In the event of a failure of the timing wave or "vote" of another center, it is merely excluded from the average, and the invention provides instrumentation which carries out the exclusion. In the event of a casualty to the local oscillator at the center under consideration, the average frequency wave, theretofore utilized for control of the local oscillator is utilized, instead, for the control of all the local operations normally carried out by the local oscillator. The center in which the failure of the local oscillator has occurred is now automatically, and temporarily, enslaved to the incoming average timing wave, and hence to all the other centers of the network.

Thus before the occurrence of any failure the timing wave sources of all the centers of the network tend to settle down on, and operate at, a frequency that is the average of all their individual frequencies, though it may not be identical with the actual frequency at which any one of them would run in the absence of its tuning control. Similarly, after a failure, all of the centers of the system, including the one at which the failure has occurred, run at the average frequency of all of the others while, as before, this average frequency may differ from the free-running (untuned) frequency of each one individually.

The invention will be fully apprehended from the following detailed description of illustrative embodiments thereof taken in connection with the appended drawings, in which.

Figures 1, 3, 6:
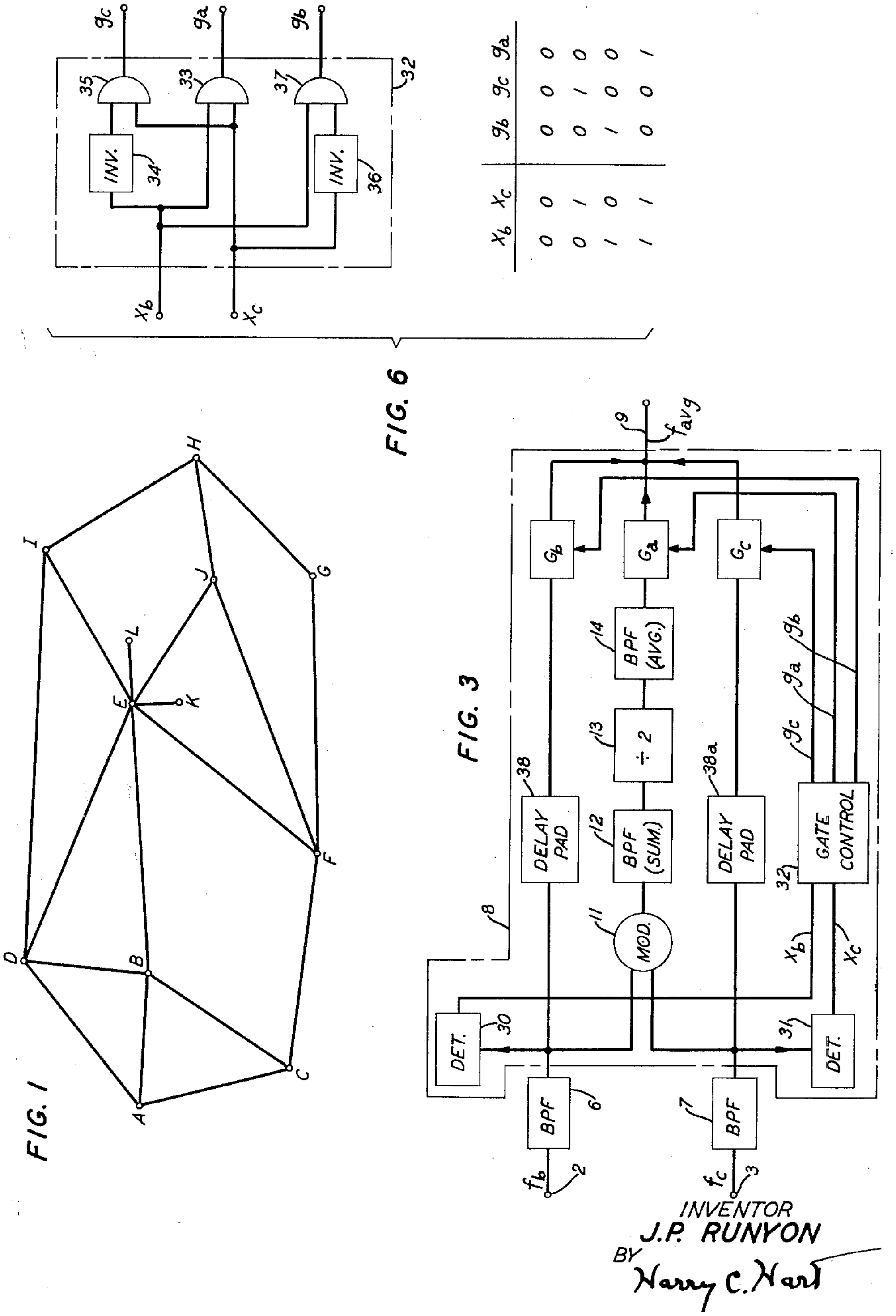
FIG. 1 is a schematic representation of a web or network of interlinked telephone switching centers.
FIG. 3 is a schematic block diagram showing a two-input averaging device.
FIG. 6 is a schematic logical diagram showing the details of the control element of FIG. 3.

Referring now to the drawings, FIG. 1 is a schematic representation of a web network of the sort in which the invention is advantageous. It comprises a web of switching centers, represented by small circles and individually identified, each interconnected with at least two of the others by a two-way communication link, here represented by a single straight line. It is contemplated that, in practice, the web network will be many times as large as the one shown: it will include some hundreds or even thousands of switching centers.

The elementary cell of which the web of FIG. 1 is composed comprises a closed loop in the form of a triangle with a node at each of its angles. An illustrative one of these triangles at the left-hand part of the figure is that composed of the nodes A, B and C in which node A is linked with nodes B and C, node B is linked with nodes A and C and node C is linked with nodes A and B, each link being a two-way communication path. In the figure, as generally in practice, each node of this unit cell is linked, in addition, to one or more other nodes. Thus node A is also linked to node D, node C is also linked to node F, while node B is also linked to node D and to node E. In addition any one of these nodes may have one or more "satellite" or "slave" nodes linked to it. Thus nodes K and L are shown as linked only to node E. Since, however, the unit cell embodies the principles of the invention, the invention will be expounded in terms of a triangular unit cell as an illustration.

Figure 2:
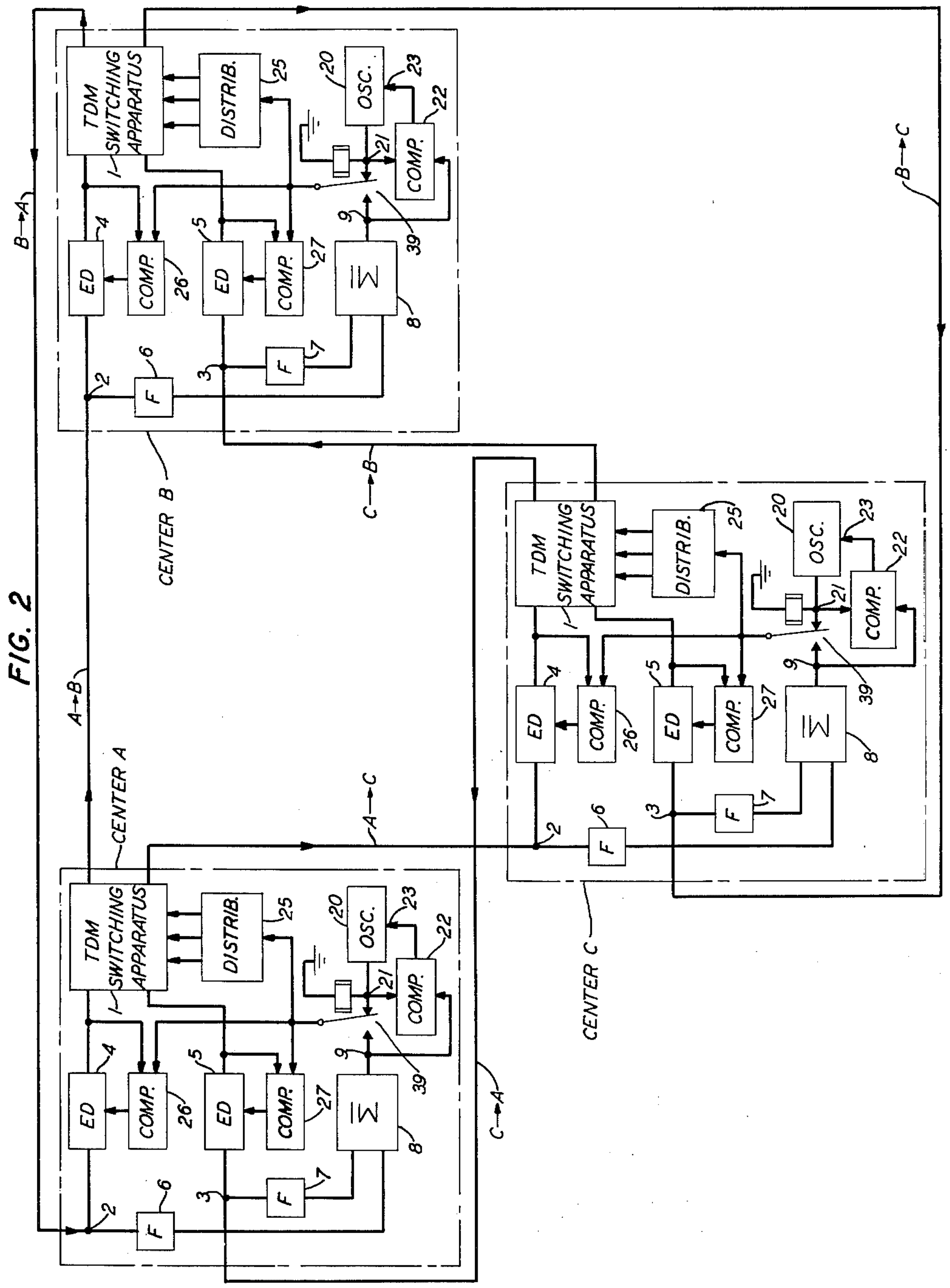
FIG. 2 is a schematic block diagram showing a unit cell of the web of FIG. 1 and the apparatus components of the three centers of which it is constituted.

Referring now to FIG. 2 this figure shows, by way of illustration and in block schematic form, three telephone switching centers designated A, B and C, the principal apparatus components of each one, and a two-way communication link extending to each of the others. To stress the similarities among the apparatus components of the several centers and their operations, they are similarly arranged and designated by like reference characters.

The purpose which the invention serves is to provide fully compatible timing controls to govern all the operations of switching and the like at the several centers. The switching apparatus itself, and the manner in which it operates, while it may be exceedingly complex, is nevertheless conventional and forms no part of the invention. Accordingly, all of this apparatus has been grouped together, at each center, in a single box 1 designated "Time Division Switching Apparatus." It is to be understood that in practice this apparatus includes all of the voice frequency lines incoming from and outgoing to individual subscribers located in the vicinity of the center as well as TDM trunks incoming from and outgoing to all the centers of the web with which the center in question is in fact linked, and also all the instrumentalities interposed, in the center, between the voice frequency lines and the TDM trunks. As indicated above, and for the sake of simplicity of the drawings and of the explanation, only two such links are shown in each case.

Referring now particularly to the center A at the upper left of the figure, an incoming line (B→A) from the center B enters at the point 2 and another incoming line (C→A) from the center C enters at the point 3. It is contemplated that each of these lines shall carry message information in pulse code form, for example, binary pulse permutation code, in which the significance of each pulse, be it a mark or a space, both from the standpoint of its digit value or denominational order and from the standpoint of its intended destination as between various subscribers, is determined solely by the particular "time slot" at which it occurs; that is to say, by its precise position in a repetitive cycle or "frame." Hence, for correct operation of decoding and switching apparatus 1 it is imperative that such apparatus be precisely controlled as to time.

The coded information on the link incoming from center B, after passing through an elastic delay device 4, enters the switching apparatus 1. Similarly the coded information on the link incoming from center C passes through another elastic delay device 5 and enters the switching apparatus. These delay devices 4, 5 and the manner in which they are controlled will be described below.

Coming now to the timing control elements proper, a bandpass filter 6 interconnects the point 2 with one input point of an averaging device 8 and another bandpass filter 7 interconnects the point 3 with the second input point of the averaging device 8. Each of these bandpass filters 6, 7 may be proportioned to pass waves of the frequency of the basic pulse repetition rate of the system and, in addition, frequencies extending over a comparatively narrow band both above it and below it. Thus the first filter 6 picks out a B center timing wave while the second filter 7 picks out a C center timing wave.

The averaging device 8 to which these timing waves are individually applied is significant to the invention. Its operation is to develop a wave at its output terminal 9 of which the frequency is the mean or average of the frequencies of the waves applied to its several input terminals. While this frequency averager 8 may take various forms, an especially simple one is shown in the central part of FIG. 3. Disregarding, for the present, the other component elements of FIG. 3 and their interconnections, the waves passing through the individual bandpass filters 6, 7 are applied together to the two input terminals of a product modulator 11 whose output therefore comprises a first component or "upper sideband" whose frequency is the sum of the frequencies of the input waves, a second component of the difference frequency and, perhaps, additional modulation products of higher order. This output is passed through a bandpass filter 12 that is so proportioned that its midband frequency is twice the nominal pulse repetition rate of the system, and whose passband extends sufficiently far above and below its midband frequency to embrace the sum frequency even though the frequencies of both of the incoming timing waves may momentarily be somewhat higher or lower than intended. It is proportioned, at the same time, to block each of the individual incoming frequencies, the difference frequency, and all higher order modulation products.

The output of this bandpass filter 12, having the frequency $f_a+f_b$, is now applied to a frequency divider 13 constructed to divide its frequency by a factor 2. The output of this divider, therefore, has a component of the frequency $$\frac{f_a+f_b}{2}$$

as well, perhaps, as unwanted components introduced by the divider 13. Such unwanted components are blocked by a bandpass filter 14. The frequency of this output is evidently the average of the frequencies of the two inputs. Its phase, which depends on the lags introduced by the various apparatus components 11, 12, 13 of the averager 8, serves as a reference phase.

Suppose, for example, that at a particular moment the frequency $f_b$ incoming from the center C has its correct nominal value $f_r$ and that, due to circumstances to be discussed below, the frequency $f_a$ incoming from the center B is higher, having the value $$f_a=f_r+\Delta$$

The operations described above produce a wave at the output of the bandpass filter having the frequency $$f_{avg}=f_r+\frac{\Delta}{2}$$

which is evidently the average of the correct incoming frequency, $f_r$, and the incorrect one, $f_r+\Delta$.

Provided only that a conduction path is established through a gate, this average frequency wave appears at the output terminal 9.

Returning to FIG. 2, the center A also includes a local oscillator 20 of conventional variety constructed to generate oscillations at the frequency of the nominal pulse rate of the system determined by a tank circuit in conventional fashion. In addition, the frequency of the output wave of this oscillator 20 is controllable, within suitable limits, as by the variation of a trimmer element forming a part of its tank circuit. The output terminal 21 of this oscillator 20 is connected to one input point of a phase comparator 22 while the output terminal 9 of the frequency averager 8 is connected to the other input point of the phase comparator 22. The phase comparator 22, which may be of any well-known construction, delivers an output that is representative of the phase discrepancy between the output wave of the local oscillator 20 and the output wave of the averager 8. The output of the comparator 22 is applied to the frequency control terminal 23 of the local oscillator 20 in well-known degenerative fashion, thus continuously to retune the local oscillator in such a way as to maintain whatever phase difference is required at the input of the comparator 22 to cause its output to tune the oscillator 20 to the frequency of the signal emerging from the averager 8. Thus the phase of the output wave of the local oscillator 20 closely follows the reference phase of the output of the averager 8 and thus provides a second reference phase.

Figure 4:
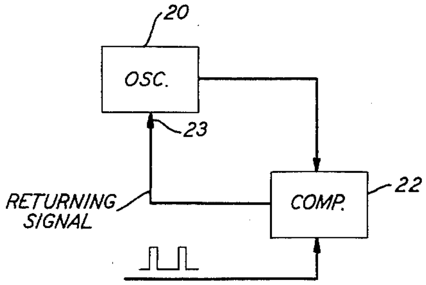
FIG. 4 is a schematic block diagram showing a tunable self-oscillator connected in a servo control loop.
Figure 5:
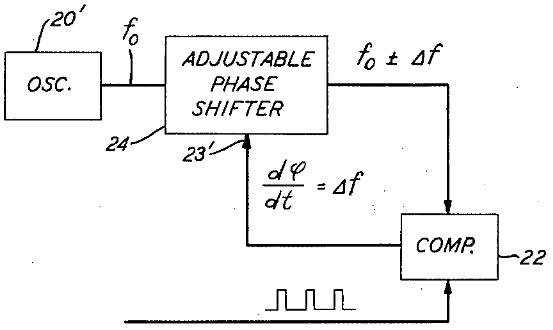
FIG. 5 is a schematic block diagram showing an equivalent of FIG. 4.

As shown in FIG. 4, the local oscillator 20 and the phase comparator 22 are thus interconnected in a servo control loop of the sort that is now well known in the art of frequency control. Examples of such servo control loops are described in de Bellescize Patent 1,976,877, granted October 16, 1934, and in Goodall Patent 2,502,-942, granted April 4, 1950. FIG. 5 shows a well-known alternative to FIG. 4, in which a variable phase delay (or advance) 24 is inserted in series with the output of an oscillator 20′ as shown in Goodall Patent 2,505,040, granted April 25, 1950. The variable phase shifter may be as described in L. A. Meacham Patent 2,004,613, granted June 11, 1935, or any of its modern high frequency counterparts.

As a practical matter it may well be advantageous to include a clipper or other wave shaper, and perhaps an amplifier as well, between the sum frequency bandpass filter 12 of FIG. 3 and the frequency divider 13. Such shaping is well known to facilitate positive action of a frequency divider such as a scale of two down-counter. Employment of a divider of this variety, of course, introduces harmonics that appear as sharp corners and edges in its output wave. These, however, are readily eliminated by the bandpass filter 14 proportioned to pass a narrow band centered on the nominal operating frequency of the system.

It may also be desirable, for practical purposes, to perform some smoothing on the output signal of the phase comparator 22, in order that the signal delivered by the oscillator 20 be prevented from changing so rapidly as to have an undesirable effect on the stability of the timing system.

The output wave of the oscillator 20 thus tuned to equality in frequency with the average of the pulse repetition rates of all the communication channels incoming to the A center, is now applied to a distributor 25 which may be conventional and is indicated as provided with three output terminals, one corresponding to each of the three centers of the illustrative system. These outputs, in turn, are applied to the three input points of the switching apparatus 1 to govern its operations of carrying out the necessary switching functions by which communications originating at any one center and destined for any other center are inserted in their respective time slots of the repetitive cycle.

In order that precise control of the timing of the switching apparatus shall succeed in producing correct distribution among the information-bearing pulse trains it is necessary that each incoming information-bearing pulse train shall arrive at the switching apparatus 1 in proper phase, measured with respect to the reference phase. It is to insure the correctness of the phase of the incoming waves that the delay devices 4, 5 are included.

Variations may take place in the phase of the incoming wave due to a variation in the length of the transmission path or, for a given path length, a variation of the wave propagation speed along it. Aside from propagation considerations, there will normally be momentary fluctuations in differences between the phase of each local oscillator and those of the others. Apart from such phase variations, each of these delay devices 4, 5 may be a fixed delay equalizer that is adjusted in the field when the system is initially set in operation. This initial adjustment may advantageously be such as to make the nominal propagation time of waves over each link, from the TDM switching apparatus at one end of the link to corresponding apparatus at the other, an integral number of frame periods.

The wave propagation speed along a transmission line or waveguide depends, to some extent, on its temperature. With a wave of high frequency traveling over a long distance, a small change in its propagation speed may be accumulated at its destination as a large phase shift. Such a phase shift, if not somehow offset, would be fatal to the correct operation of the switching and distribution network. The invention provides against this contingency by the continuous readjustment of each of the elastic delay devices 4, 5 in such a way as to maintain the desired phase condition of the information wave as it enters the switching network. This readjustment is effected by phase comparison of each phase-adjusted information-bearing wave with the locally generated timing wave. Thus the output of the local oscillator 20 is applied to one input point of a comparator 26 while the wave incoming from center B, and variably delayed by the elastic delay device, is applied to the other input point of the comparator 26. The comparator 26, which may be similar to the comparator 22 that controls the tuning of the oscillator 20, delivers a control signal to the elastic delay device 4, thus to alter it in such a way as to hold the phase condition of its output to the preassigned desired relation with the repetitive switching cycle. The same holds for a comparator 27 that controls readjustment of the delay device 5 in the same way and to the same end.

A phase shift of the same kind, and perhaps even more severe, can result when the length of a communication path changes. This may occur either because the distance separating two centers changes, as in the case of mobile centers or, in the case of fixed centers, when the transmission is by way of reflection from a satellite, natural or artificial. The phase comparator 26, or 27 responds in the same way whatever may be the cause of the phase shift in the incoming information-bearing wave. In each case it operates to hold the phase of the wave applied to the switching network 1 to its preassigned desired value.

The controllable elastic delay device 4, or 5 may be of any desired construction, a suitable one, together with its control mechanism being described in an application of W. A. Malthaner, Serial No. 706,358, filed December 31, 1957.

It is a feature of the invention that communication continues between each center and all the others of the network despite failure of the timing wave source at any one. To this end, a timing wave that has failed at one center is excluded from the average at all of the other centers and, at the same time, it is arranged that it shall no longer govern the operations of its own center. Thus, for example at center A, if the timing wave of frequency $f_b$ (FIG. 3) incoming from center B should fall below a preassigned threshold level, the output of a detector 30, designated $x_b$, fails. Similarly, if the timing wave $f_c$, incoming from center C should fall below a preassigned threshold level the output of another detector 31, designated $x_c$, fails. In the presence of both of these timing waves above their preassigned threshold levels the outputs of both detectors $x_b$ and $x_c$ are simultaneously present.

These outputs $x_b$, $x_c$, of the detectors 30, 31 are applied to a gate control device 32 which may be a simple logic circuit as shown in FIG. 6 which governs three outputs designated $g_b$, $g_c$ and $g_a$, respectively. In FIG. 6, $x_b$ and $x_c$ are applied to the two input points of an AND gate 33 which delivers an output when they are both present and not otherwise. This output enables a switch or gate $G_a$ in series with the central average-frequency path, thus to deliver a signal of frequency $f_{avg}$ at the output point 9 of FIG. 3. At the same time, and through an inverter 34 which may be conventional, the presence of the signal $x_b$ disables the upper AND gate 35 while the presence of the signal $x_c$, through a second inverter 36 disables the lower AND gate 37. Thus the individual timing waves $f_b$ and $f_c$, provided both are present in excess of the threshold, are blocked from the output terminal 9 of FIG. 3. However, if one of them, e.g., $x_b$ fails, the central AND gate 33 is disabled for lack of them both, the lower AND gate 37 is doubly disabled while, through the upper inverter 34, failure of the signal $x_b$ enables the upper AND gate 35 which delivers a control signal to the switch $G_c$, thus to enable a through path for the timing wave $f_c$ to the output terminal 9. Similarly, failure of the timing wave $f_c$ acts to establish a through path for the remaining timing wave $f_b$. The operations of the circuit of FIG. 6 are set forth in the tabulation below it. This feature, that correct averaging is preserved despite failure of one or more of its terms, thus has fail-safe properties. The phase delay introduced by the components 11, 12, 13 14 in the central, averaging, path, is offset by compensating delay devices 38, 38A connected in tandem in the upper and lower paths.

If, to the contrary, the local oscillator 20 at center A (FIG. 2), should fail while the incoming timing waves from centers B and C continue, it is then desirable that the failing local oscillator be removed from the system and that the operations of distribution and switching at center A be governed, instead, by the incoming average frequency timing wave.

To this end, the output of the local oscillator 20 passes through the front contact of a relay 39 which is held up by the output of the oscillator 20 itself. When the output of this oscillator 20 fails the tongue of the relay 39 drops to its back contact, whereupon the output of the averager 8 takes control of the distributor 25 and of the several phase comparators 26, 27 that control the elastic delay devices 4, 5. This feature may be termed the "home-fail-safe" feature.

Thus the system is rendered invulnerable to the failure of any single local oscillator or of its timing wave. Such a failure is reflected merely in the removal of a single "vote" as to what the operating frequency of the entire system shall be. Moreover, the failure is of no greater effect on the center at which the failing oscillator is located than on the other centers of the system. Thus the consequences of such a failure are distributed over the entire system and, at the same time, are reduced to minor proportions.

Figure 7:
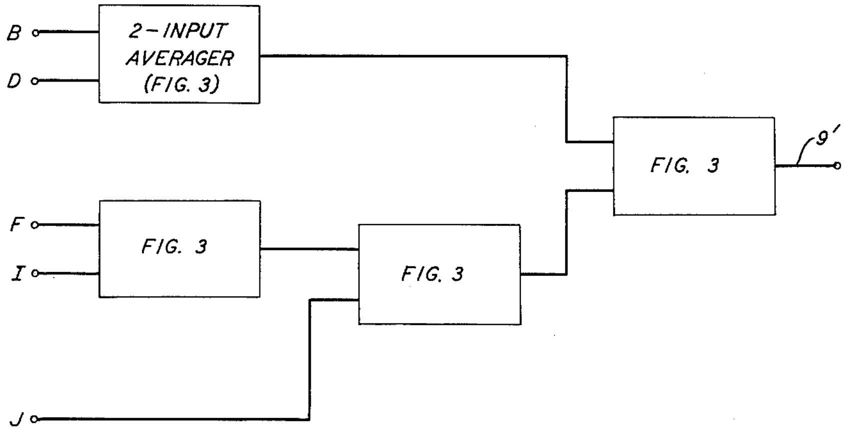
FIG. 7 is a schematic block diagram showing a plurality of two-input averagers connected in a tree network.

The frequency averager 8 of FIG. 3 is peculiarly fitted to form the average of two input frequencies. As a practical matter, each center of the network may well be interlinked with a number of other centers that is much greater than two. In accordance with the invention all of them are to be averaged. The averaging of a number of input frequencies greater than two can be carried out in various ways, one arrangement being shown in block schematic form in FIG. 7. Essentially, it is a tree of two-input averagers, each of which may be as shown in FIG. 3. It is illustrated as forming the average of all the timing waves incoming to center E of FIG. 1, namely, those from centers B, D, F, I and J. It may be noted that the average frequency as it appears at the output terminal 9' of FIG. 7, while it is influenced by and depends on all of the various incoming frequencies, depends on them to different degrees: in the average the several incoming waves may be variously weighted. Provided the number of inputs is 2, 4, 8 . . . $2^n$ the weighting factors are alike, but otherwise not. Because, after the occurrence of any transient disturbance the system as a whole seeks and finds an equilibrium operating frequency while all of the individual timing waves converge on this frequency, equality of the weighting factors in the tree of FIG. 7 is not important.

Returning to the averager of FIG. 3, it is inherent in the manner of operation of this device that, if both of its input timing waves should fail, the frequency of its output would tend toward zero. Similarly, if there be a number of input timing waves larger than two and if the frequency averager be of the form shown in FIG. 7, and if all of these inputs should fail simultaneously, the frequency of the output signal would tend toward zero. Through the servo control loop of each of the centers of FIG. 2, this condition would tend to drive the frequency of the local oscillator 20 toward zero, a condition which is, of course, to be avoided. Hence, if the simultaneous failure of all of the input timing waves to any single averaging device be considered a possibility that is not unreasonably remote, provision may be made for preventing this consequence. To this end, an auxiliary path may be provided extending from the output terminal of each averager to the frequency control terminal of the local oscillator at the same center. This may include a detector which responds to a low frequency component in the output of the averager and, upon detecting such low frequency component, disables the path from the comparator to the oscillator, whereupon the oscillator runs free. With sufficient frequency stability, the phase of the output wave of the oscillator may not have undergone an excessive shift before one or more of the incoming timing waves returns, in which case the oscillator is pulled into step with their average. If, when synchronism returns, framing be found to be incorrect it may be restored in any well-known fashion as described, for example, in one or other of the following patents: J. G. Kreer-E. Peterson 5,527,638, October 31, 1950; E. Peterson 2,527,649, October 31, 1950; E. Peterson 2,527,650, October 31, 1950; and E. Peterson 2,546,316, March 27, 1951.

During the persistence of the total failure of incoming timing waves and while the local oscillator 20 is running free, the center for which the total failure has occurred is no longer fully synchronized with the other centers of the network and may therefore be unable to communicate with them. However, its own switching apparatus continues to be driven by its own self-oscillator, now running free, so that its service to its local subscribers is not interfered with.

Figure 8:
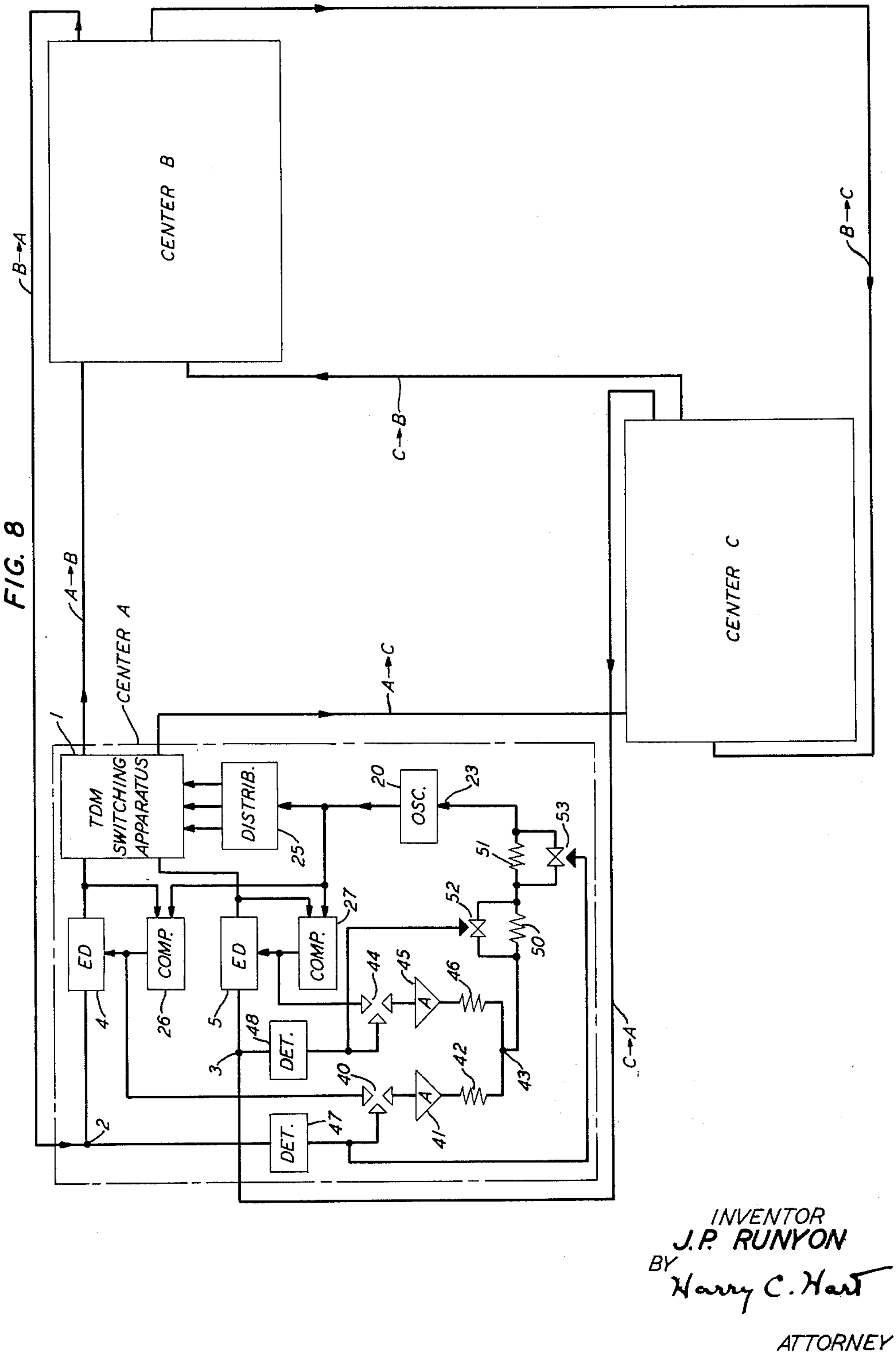
FIG. 8 is a schematic block diagram showing an alternative to the system of FIG. 2.

FIG. 8, in which the components of the center A are shown, centers B and C being merely indicated as identical, illustrates an alternative to the system of FIG. 2 in which the averager is not subject to the restriction discussed above. To the contrary, when all of its inputs fail, it ceases to drive the frequency of the local oscillator either upward or downward. Here, the time division switching apparatus 1, the distributor 25, the elastic delay devices 4, 5, the comparators 26, 27 which control them and the local oscillator 20 are the same as in FIG. 2 and are similarly identified. The averager, shown in the lower left-hand portion of the center A, now forms an average, not of frequencies directly as in the case of FIG. 3, but of steady voltages or currents proportional to the phase discrepancies between the incoming timing waves and the output wave of the local oscillator 20. To this end, the output of the first comparator 26 is passed through a switch 40, an amplifier 41 and a padding resistor 42 to an adding point 43, while the output of the second comparator 27 is similarly passed through a switch 44, an amplifier 45 and a padding resistor 46 to the same adding point 43. (Each of the switches is shown conventionally as two opposed arrowheads, representing conduction terminals and slightly spaced apart to indicate a break, and a third arrowhead of the same kind pointing toward the intersection of the first two and representing a control terminal which, when energized, establishes a conduction path between the first two arrowheads. Elsewhere, switches that are normally closed, to be opened on the application of a control signal, are conventionally represented by two opposed arrowheads in mutual contact and a third control arrowhead of different kind pointing toward the intersection of the first two.) A steady signal is derived from the incoming wave from center B by a detector 47 and is applied to the control point of the first switch 40, thus to hold the conduction path through this switch 40 in enabled condition while the wave from center B persists. Similarly, a control signal is derived by a second detector 48 from the wave incoming from center C and is applied to the control point of the second switch 44 to hold it enabled similarly. With this arrangement, the signal appearing at the adding point 43 is evidently proportional to the sum of the output signals of the two comparators 26, 27. It is passed, when present as a sum, through two resistors 50, 51 in series to the frequency control terminal 23 of the local oscillator 20, thus to tune it and so hold its frequency at the average of the frequencies of the incoming waves.

Each of the two resistors 50, 51 is shunted by a switch (52, 53) that is controlled by the output of one of the detectors 47, 48 in such a way that, upon the failure of either of the input timing waves, conduction through the corresponding switch, 52 or 53, is established, thus to place a short circuit around the associated resistor 50 or 51. At the same time, the first switch 40 or 44 acts to open the path from the comparator 26 or 27 connected to the transmission link whose timing wave has failed. Thus, on the failure of either incoming signal, its contribution to the sum formed at the adding point 43 is nullified while the loss interposed by the resistor 50 or 51 in series with the adding point 43 is removed. Similarly, on failure of both the timing waves, both the inputs and both the loss resistors are removed. Hence, this system forms the average of the comparator outputs, no matter how many of them may be present. Moreover, when all of the input waves to a particular center fail, the output of this averager simply falls to zero. A zero signal applied to the tuning point 23 of the local oscillator 20 simply fails to alter its frequency, which thus remains unchanged throughout the persistence of the total failure of all of the incoming waves.

This advantageous behavior is secured, however, at a price; namely, that no center is immune to a failure of its own local oscillator; i.e., the home-fail-safe feature of FIG. 2, instrumented in the center A by the relay and in the other centers similarly, is not included in the system of FIG. 8.

What is claimed is:

1. In a time division multiplex communication system comprising a plurality of switching centers, each of which is linked by incoming and outgoing communication channels with at least two other centers of said plurality, means at each center for governing sequential operations at said center, which comprises means for deriving from each incoming channel a timing wave individual to said channel, means for developing a reference wave having the average frequency of all of said incoming timing waves and a first reference phase, a source of oscillations of controllable frequency, means for comparing the phase of the output wave of said local source with said reference phase, means responsive to said comparison for retuning the frequency of said local oscillation source in a sense to reduce the magnitude of a phase discrepancy indicated by said comparison, thereby to provide a second reference phase of said average frequency, means for utilizing the output of said local source, as thus retuned, to govern the timing operations of said center, means for individually comparing the phases of all of said incoming waves with said second reference phase, a controllable elastic delay device individual to each of said incoming channels and connected in tandem therewith, and means responsive to each individual phase discrepancy observed in said last-named comparisons for altering the magnitude of the delay introduced by said individual delay device.

2. In combination with apparatus as defined in claim 1, means responsive to a failure of any one of said incoming waves for excluding it from said average.

3. Apparatus as defined in claim 1, wherein said reference wave developing means comprises, for each pair of incoming timing waves, a product modulator having two input points and an output point, connections for applying said two incoming timing waves to said input point, one to each, thus to develop at said output point a complex wave of a plurality of components, at least one of which has a frequency equal to the sum of the frequencies of said two individual timing waves, and a frequency divider having an input point coupled to the output point of said modulator, said divider being proportioned to deliver, at its output point, an output wave having a frequency equal to one half of the frequency applied to its input point.

4. In a time division multiplex communication system comprising a first, a second and a third switching center, said first center being linked by incoming and outgoing communication channels with the two other centers, means at the first center for governing its sequential operations, which comprises means for deriving individual auxiliary waves incoming from said second and third centers, means for developing an average reference wave from said individual auxiliary waves, a source of oscillations of controllable frequency, means for comparing the phase of the output wave of said local source with the phase of said reference wave to derive an indication of a phase discrepancy, means responsive to said comparison for retuning the frequency of said local oscillation source in a sense to reduce the magnitude of said indicated phase discrepancy, thereby to provide a reference phase, means for utilizing the output of said local source, as thus retuned, to govern the timing operations of said first center, means for individually comparing the phases of the waves incoming from the second and the third centers respectively with said reference phase to derive individual phase discrepancy indications, a controllable elastic delay device individual to each of said incoming channels and connected in tandem therewith, and means responsive to each last-named individual phase discrepancy indication for altering the magnitude of the delay introduced by said individual delay device.

5. In combination with apparatus as defined in claim 4, means responsive to the failure of any one of said auxiliary waves for excluding it from said average.

6. In a time division multiplex communication system comprising a plurality of switching centers, each of which is linked by incoming and outgoing communication channels with at least two other centers of said plurality, means at each center for governing sequential operations at said center, which comprises means for deriving from each incoming channel an auxiliary wave individual to said channel, means for developing an average reference wave from said individual auxiliary waves, a source of oscillations of controllable frequency, means for comparing the phase of the output wave of said local source with the phase of said reference wave to derive an indication of a phase discrepancy, means responsive to said comparison for retuning the frequency of said local oscillation source in a sense to reduce the magnitude of said indicated phase discrepancy, thereby to provide a reference phase, means for utilizing the output of said local source, as thus retuned, to govern the timing operations of said center, and means responsive to the failure of any one of said incoming timing waves for excluding its influence from said average reference wave.

7. In combination with apparatus as defined in claim 6, means for individually comparing the phases of all of said incoming waves with said reference phase to derive individual phase discrepancy indications, a controllable elastic delay device individual to each of said incoming channels and connected in tandem therewith, and means responsive to each last-named individual phase discrepancy indication for altering the magnitude of the delay introduced by said individual delay device.

8. In a time division multiplex communication system comprising at least three switching centers each of which is linked by incoming and outgoing communication channels with both of the others, means at a first one of said centers for governing sequential operations at said first center, which comprises means for deriving from each incoming channel an auxiliary wave individual to said channel, means for developing from said two auxiliary waves a reference timing wave having the average frequency of both of said auxiliary waves and a reference phase, means for utilizing said reference wave to control the timing operations of said first center, means for individually comparing the phases of both of said incoming information-bearing waves with said reference phase to derive individual phase discrepancy indications, a controllable elastic delay device individual to each of said incoming channels and connected in tandem therewith, and means responsive to each of said individual phase discrepancy indications for altering the magnitude of the delay introduced by said individual delay device.

9. In a time division multiplex communication system comprising a plurality of switching centers, each of which is linked by incoming and outgoing communication channels with at least two other centers of said plurality, means at each center for governing sequential operations at said center, which comprises means for deriving from each incoming channel a timing wave individual to said channel, means for developing a reference wave having the average frequency of all of said incoming timing waves and a first reference phase, a source of oscillations of controllable frequency, means for holding the oscillations of said source, on the average, to a frequency equal to said average frequency, means for utilizing the output of said local source, as thus governed, to control the timing operations of said center, means for individually comparing the phases of all of said incoming waves with said second reference phase to derive individual phase discrepancy indications, a controllable elastic delay device individual to each of said incoming channels and connected in tandem therewith, and means responsive to each last-named individual phase discrepancy indication for altering the magnitude of the delay introduced by said individual delay device.

10. In a time division multiplex communication system comprising a plurality of switching centers, each of which is linked by incoming and outgoing communication channels with at least two other centers of said plurality, means at each center for governing sequential operations at said center, which comprises means for deriving from each incoming channel a timing wave individual to said channel, means for developing a reference wave having the average frequency of all of said incoming timing waves and a first reference phase, a source of oscillations of controllable frequency, means for holding the oscillations of said source, on the average, to a frequency equal to said average frequency, means for utilizing the output of said local source, as thus governed, to control the timing operations of said center, and means responsive to the failure of any one of said incoming timing waves for excluding it from said average.

11. In a time division multiplex communication system comprising a plurality of switching centers, each of which is linked by incoming and outgoing communication channels with at least two other centers of said plurality, means at each center for governing sequential operations at said center, which comprises means for deriving from each incoming channel a timing wave individual to said channel, means for developing a reference wave having the average frequency of all of said incoming timing waves and a reference phase, a source of oscillations of controllable frequency, means for holding the oscillations of said source, on the average, to a frequency equal to said average frequency, means for utilizing the output of said local source, as thus governed, to control the timing operations of said center, and means for also utilizing the output of said local source, as thus governed, for individually coordinating the phases of information-bearing waves incoming on said several channels with the timing operations of said center.

12. In combination with apparatus as defined in claim 11, means responsive to the failure of any one of said incoming timing waves for excluding it from said average.

13. In a time division multiplex communication system comprising a plurality of switching centers, each of which is linked by incoming and outgoing communication channels with at least two other centers of said plurality, means at each center for governing sequential operations at said center, which comprises means for deriving from each incoming channel a timing wave individual to said channel, means for developing a reference wave having the average frequency of all of said incoming timing waves and a reference phase, means for utilizing said reference wave to control the timing operations of said center, and means for also utilizing said reference wave for individually coordinating the phases of information-bearing waves incoming on said several channels with the timing operations of said center.

14. In combination with apparatus as defined in claim 13, means responsive to the failure of any one of said incoming timing waves for excluding it from said average.

15. In a time division multiplex communication system comprising a plurality of switching centers, each of which is linked by incoming and outgoing communication channels with at least two other centers of said plurality, means at each center for governing sequential operations at said center, which comprises means for deriving from each incoming channel a timing wave individual to said channel, means for developing a reference wave having the average frequency of all of said incoming timing waves and a first reference phase, a source of oscillations of controllable frequency, means for holding the oscillations of said source, on the average, to a frequency equal to said average frequency, means for utilizing the output of said local source, as thus retuned, to govern the timing operations of said center, means for individually comparing the phases of all of said incoming waves with said second reference phase to derive individual phase discrepancy indications, a controllable elastic delay device individual to each of said incoming channels and connected in tandem therewith, means responsive to each last-named individual phase discrepancy indication for altering the magnitude of the delay introduced by said individual delay device, and means responsive to the failure of said local oscillation source for utilizing said first-named reference wave, instead of the output of said local source, for governing the timing operations of said center.

16. In a web network of at least three mutually interconnected control centers, apparatus at each center for establishing and maintaining synchronism of the centers with respect to each other, which comprises an adjustable frequency oscillator for timing message waves of local origin, means for deriving a timing wave from each message wave incoming from another control center, means for developing a frequency average of the derived timing waves by summing their frequencies and dividing by their total number, means for adjusting the local oscillator to the frequency of the said average, thereby to synchronize all of said control centers to a first average frequency, and means responsive to a failure of said local oscillator for timing said message waves of local origin by said average, thereby to re-synchronize on said failure all of said control centers to a second average frequency.

17. In a web network of at least three mutually interconnected control centers, apparatus at each center for establishing and maintaining synchronism of the centers with respect to each other which comprises a tunable source of local oscillations for timing message waves of local origin, means for deriving from each message wave, arriving on an incoming channel from another center, a timing wave individual to said other center, means for individually comparing the phases of all of said derived timing waves with the phase of said local oscillations to derive individual phase error signals, means for averaging all of said phase error signals to develop a timing control signal, and means for applying said timing control signal to said local source to retune it in a sense to reduce said average phase error signal, thereby to bring all of said control centers into synchronism at an average frequency.

18. In combination with apparatus as defined in claim 17, a controllable elastic delay device individual to each of said incoming channels and connected in tandem therewith, and means responsive to the several individual phase error signals for altering the magnitudes of the delays introduced into the several message waves by their respective delay devices in senses to reduce the magnitudes of the several individual phase error signals.

19. In combination with apparatus as defined in claim 17, means responsive to a failure of any incoming message wave for excluding its timing wave from the averaging means, thereby to resynchronize the unfailing ones of said control centers at a different average frequency.

References Cited in the file of this patent

UNITED STATES PATENTS 2,457,986 Edson ------------------- Jan. 4, 1949